United States Patent
Matsumoto et al.

(10) Patent No.: US 10,906,540 B2
(45) Date of Patent: Feb. 2, 2021

(54) VEHICLE CONTROL APPARATUS

(71) Applicants: DENSO CORPORATION, Kariya (JP); TOYOTA JIDOSHA KABUSHIKI KAISHA, Toyota (JP)

(72) Inventors: Yusuke Matsumoto, Kariya (JP); Keitaro Niki, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/219,042

(22) Filed: Dec. 13, 2018

(65) Prior Publication Data

US 2019/0184989 A1 Jun. 20, 2019

(30) Foreign Application Priority Data

Dec. 15, 2017 (JP) .................. 2017-240896

(51) Int. Cl.
*B60W 30/12* (2020.01)
*G06K 9/00* (2006.01)
*B60W 40/072* (2012.01)
*B60W 10/20* (2006.01)

(52) U.S. Cl.
CPC ............ *B60W 30/12* (2013.01); *B60W 10/20* (2013.01); *B60W 40/072* (2013.01); *G06K 9/00798* (2013.01)

(58) Field of Classification Search
CPC .... B60W 30/12; B60W 10/20; B60W 40/072; G06K 9/00798

USPC ........................................... 701/41
See application file for complete search history.

(56) References Cited

U.S. PATENT DOCUMENTS

| 6,577,334 B1* | 6/2003 | Kawai | B60G 17/0165 |
| | | | 348/148 |
| 6,850,629 B2* | 2/2005 | Jeon | G06T 7/64 |
| | | | 340/934 |
| 8,473,161 B2* | 6/2013 | Izutani | B62D 5/0484 |
| | | | 701/43 |
| 9,360,328 B2* | 6/2016 | You | G01C 21/28 |
| 9,632,176 B2* | 4/2017 | Choi | G01S 13/867 |
| 2002/0080235 A1* | 6/2002 | Jeon | G06T 7/73 |
| | | | 348/116 |
| 2003/0014162 A1* | 1/2003 | Sadano | B62D 15/0265 |
| | | | 701/1 |
| 2004/0102884 A1 | 5/2004 | Tange et al. | |
| 2004/0230375 A1* | 11/2004 | Matsumoto | B60W 30/12 |
| | | | 701/301 |

(Continued)

FOREIGN PATENT DOCUMENTS

JP H09-081757 A 3/1997
JP 2004-178159 A 6/2004

(Continued)

*Primary Examiner* — Angelina Shudy
(74) *Attorney, Agent, or Firm* — Maschoff Brennan (57) ABSTRACT

Control unit estimates a curvature of an own lane based on a marking detected from an image captured by an imaging device. The control unit performs a steering control of the own vehicle in accordance with the estimated curvature of the own lane. When determining that only single side marking in both left and right markings is present and the road slope changes, the control unit apply restriction to the steering control performed in accordance with the curvature of the own lane.

5 Claims, 6 Drawing Sheets

(56) References Cited

U.S. PATENT DOCUMENTS

| | | | | |
|---|---|---|---|---|
| 2005/0107939 A1* | 5/2005 | Sadano | | B60T 8/17557 |
| | | | | 701/70 |
| 2005/0273260 A1* | 12/2005 | Nishida | | B60Q 1/346 |
| | | | | 701/301 |
| 2006/0220455 A1* | 10/2006 | Schmidt | | B60T 7/122 |
| | | | | 303/191 |
| 2010/0023215 A1* | 1/2010 | Segawa | | B62D 5/0457 |
| | | | | 701/41 |
| 2010/0238283 A1 | 9/2010 | Kim | | |
| 2010/0318234 A1* | 12/2010 | Moore | | H02J 7/35 |
| | | | | 700/293 |
| 2010/0318254 A1* | 12/2010 | Yamamura | | B60W 40/12 |
| | | | | 701/31.4 |
| 2011/0060505 A1* | 3/2011 | Suzuki | | B60W 30/18009 |
| | | | | 701/42 |
| 2012/0125707 A1* | 5/2012 | Frank | | B62D 1/28 |
| | | | | 180/169 |
| 2012/0173082 A1* | 7/2012 | Ono | | B62D 6/001 |
| | | | | 701/42 |
| 2012/0245756 A1* | 9/2012 | Cooprider | | B60W 30/146 |
| | | | | 701/1 |
| 2013/0202155 A1* | 8/2013 | Karanam | | G06K 9/00798 |
| | | | | 382/104 |
| 2014/0336842 A1* | 11/2014 | Jang | | G06K 9/00805 |
| | | | | 701/1 |
| 2015/0225014 A1* | 8/2015 | Takeda | | B62D 15/025 |
| | | | | 701/41 |
| 2016/0171315 A1* | 6/2016 | Yi | | G06K 9/00791 |
| | | | | 382/154 |
| 2017/0043772 A1 | 2/2017 | Watanabe | | |
| 2017/0068248 A1* | 3/2017 | Kobayashi | | G05D 1/0246 |
| 2017/0137061 A1* | 5/2017 | Azuma | | B62D 15/021 |
| 2018/0032082 A1* | 2/2018 | Shalev-Shwartz | | |
| | | | | G05D 1/0231 |
| 2018/0186405 A1* | 7/2018 | Nakahara | | B60W 30/12 |
| 2019/0193787 A1* | 6/2019 | Matsumoto | | B62D 6/00 |
| 2019/0351941 A1* | 11/2019 | Uematsu | | B62D 6/02 |

FOREIGN PATENT DOCUMENTS

| | | |
|---|---|---|
| JP | 2010-218528 A | 9/2010 |
| JP | 2014-157429 A | 8/2014 |
| JP | 2017-037473 A | 2/2017 |

* cited by examiner

VEHICLE CONTROL APPARATUS

CROSS-REFERENCE TO RELATED APPLICATION

This application is based on and claims the benefit of priority from earlier Japanese Patent Application No. 2017-240896 filed Dec. 15, 2017, the description of which is incorporated herein by reference.

BACKGROUND

Technical Field

The present disclosure relates to a vehicle control apparatus that performs a steering control of a vehicle.

Description of the Related Art

As an example of the vehicle control apparatus, an apparatus is known in which a shape of the own lane is estimated by using left and right markings in a captured image in which an area ahead of the own vehicle is captured and steering control of the own vehicle is executed based on the estimated shape of the own vehicle. In such an apparatus, in the case where only one side, i.e. either of the left and right markings is detected, the apparatus estimates the shape of the own lane based on the detected marking of the left and right markings. For example, Japanese Patent Application Laid-Open Publication Number 2017-37473 discloses an apparatus that sets a virtual marking on one side, where no marking is detected, of both left and right markings, and determines a vehicle width in the own lane by using the virtual marking and the detected marking.

According to the above-mentioned patent literature, when the own vehicle travels on a straight road, if single side marking of the left and right markings is detected, the other side marking can be estimated, so that the curvature of the travelling road can be estimated based on the left and right markings including the estimated marking. However, it is hard to estimate the other side marking when the own vehicle travels on a curved road. In this case, it is considered that the curvature is estimated based on single side marking.

Here, when only single side marking is detected, the curvature cannot be estimated correctly depending on a road situation and may cause a negative influence on a steering control. For example, when only single side marking is detected and a down slope is present halfway ahead of the own vehicle, the marking in the captured image is distorted. In this case, when estimating the shape of the own lane which changes in road slope, by using only single side marking of the left and right markings, due to the distortion of the marking, the apparatus possibly applies unnecessary steering to the own vehicle.

SUMMARY

The present disclosure is achieved in light of the above-described circumstances, and provides a vehicle control apparatus that avoids applying an unnecessary steering amount to the own vehicle when the shape of the own lane is estimated using only single side marking in the left and right markings.

The present disclosure provides a vehicle control apparatus including a marking detection unit that detects a marking defining an own lane based on an image ahead of an own vehicle captured by an imaging device;

a curvature estimation unit that estimates a curvature of the own lane ahead of the own vehicle based on the marking detected by the marking detection unit;

a control unit that performs a steering control of the own vehicle based on the curvature of the own lane estimated by the curvature estimation unit;

a single side determination unit that determines whether the marking detected by the marking detection unit is only a marking on a single side, among both left side and right side markings, as a single side marking; and a slope determination unit that determines whether a change in the road slope is present ahead of the own vehicle. The control unit is configured to apply restriction to the steering control during a change road determination state where only the single side marking is detected and a change in the road slope is detected.

In the case where a road slope changes, due to the change in the road slope, the detected marking in the captured image is likely to be distorted in the vehicle width direction. Hence, the distorted marking influences the curvature of the own lane estimated from single side marking to generate an erroneous curvature value compared to the actual curvature value. Then, an unnecessary amount of steering of the own vehicle may be applied. In this regard, according to the present disclosure configured as described above, during a change road determination state where only the single side marking has been detected and a change in the road slope has been detected, restriction is applied to the steering control performed based on the curvature of the own lane. In this case, when estimating the shape of the own lane based on the single side marking on the road having a slope, unnecessary restriction can be prevented from being applied to the own vehicle.

DETAILED DESCRIPTION OF THE PREFERRED EMBODIMENTS

First Embodiment

Figure 1:
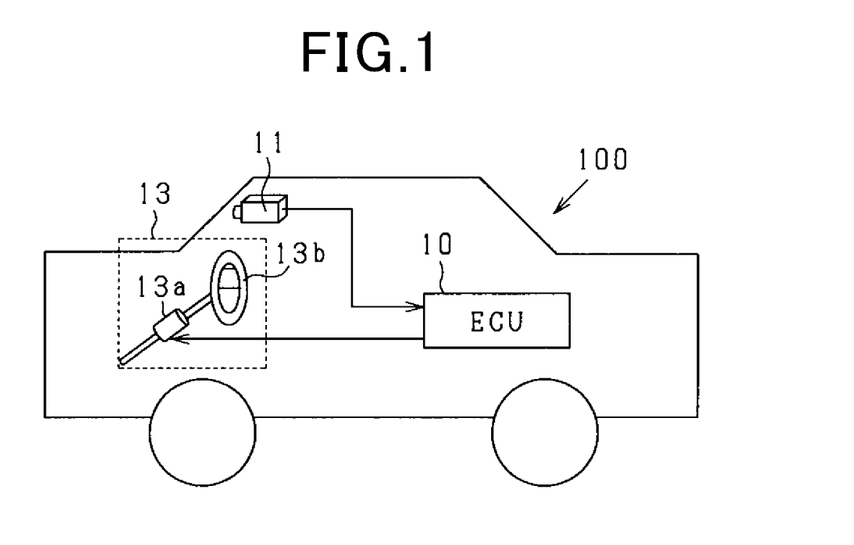
FIG. 1 is a diagram showing a steering control system according to embodiments of the present disclosure.

With reference to FIG. 1, a steering control system 100 applied to a vehicle will be described. The steering control system 100 is provided with an ECU 10, an imaging device 11, and a steering apparatus 13. According to the present embodiment, the ECU 10 corresponds to a vehicle control apparatus.

The imaging device 11 is attached to the own vehicle in a center position of the vehicle width direction at a predetermined height, whereby an area ahead of the own vehicle spreading in a predetermined angle range is captured as a bird's-eye view, and the captured image is outputted to the ECU 10. The imaging device 11 is configured as, for example, a CCD (charge coupled device) camera, a CMOS (complementary metal oxide semiconductor) image sensor and an infrared camera. Note that the imaging device 11 is a monocular camera according to the present embodiment, but a stereo camera can be used.

The steering apparatus 13 is provided with a steering 13b, and a steering motor 13a. The steering motor 13a generates a steering torque for steering the driving wheels included in the own vehicle. The larger the steering torque, the larger the steering amount of own vehicle is.

The ECU 10 is a computer provided with CPU, RAM, ROM and I/O. The CPU executes a program installed in the ROM, thereby performing a steering control to the vehicle. According to the present embodiment, the ECU 10 executes a lane keeping assist (LKA) control having the vehicle travel in accordance with a marking line that defines the own lane. In the LKA control, the ECU 10 estimates a road curvature of the own lane by using a detected marking in the captured image, and sets the steering amount of the steering apparatus 13 based on the estimated road curvature.

The ECU 10 detects the marking based on a feature quantity such as luminance in the captured image. Specifically, the ECU 10 extracts edge points of the marking from the captured image, performs Hough transformation to the extracted plurality of edge points, and acquire series of edge points which are candidates of the marking. Then, the ECU 10 calculates a degree of existence of a feature as a marking for each of the plurality of markings, and detects a candidate having the largest degree of existence of the feature to be the marking. According to the present embodiment, the ECU 10 corresponds to marking detection unit.

The ECU 10 estimates a road curvature of the own lane based on the detected marking using the captured image. According to the present embodiment, the ECU 10 detects the center points between the left and right markings at predetermined intervals, from a front area of the own vehicle to a distance area ahead of the own vehicle. Then, the ECU 10 calculates an approximation formula of a line connecting the detected center points, and estimates the road curvature.

Also, the ECU 10 estimates the road curvature based on a marking on one side (single side marking) from the left and right markings, when detecting only single side marking in the left and right markings from the captured image. For example, the ECU 10 calculates an approximation formula that approximates the detected single side marking of the left and right markings, and estimates the road curvature by using the calculated approximation formula. The ECU 10 corresponds to a curvature estimation unit.

The ECU 10 sets, based on the estimated road curvature, a target steering amount Ta and a steering change rate R indicating a change rate of the steering amount. According to the present embodiment, the target steering amount Ta and the steering change rate R are set using a road curvature of a lane section from a current location of the own vehicle to a location at which the own vehicle reaches when a predetermined period has elapsed. Hereinafter, among road curvatures used for setting the target steering amount Ta and the steering change rate R, a road curvature estimated based on both left and right markings is referred to as a first curvature $\rho 1$ and a road curvature estimated based on a single side marking of the left and right markings is referred to as a second curvature $\rho 2$.

Figure 2:
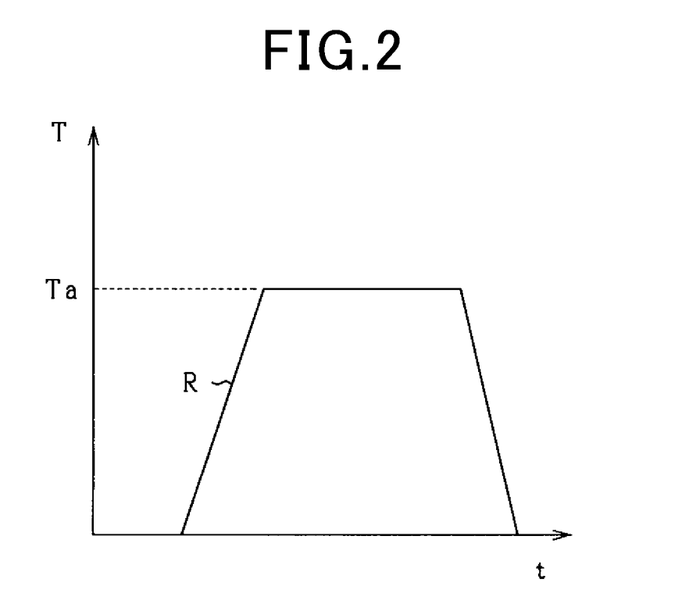
FIG. 2 is a graph showing a steering amount set by ECU (electronic control unit)

FIG. 2 is a timing diagram of a steering amount T in which the vertical axis shows the steering amount T. As shown in FIG. 2, the target steering amount Ta shows a maximum value of the steering amount required for the current steering operation. According to the present embodiment, the target steering amount Ta is set to be a value where a predetermined gain K1 is added to either the first curvature $\rho 1$ or the second curvature $\rho 2$. The steering change rate R shows a change rate of the steering amount T per unit of time. Specifically, the change rate R indicates respective change rates of the steering amount when the steering amount T increases to the target steering amount Ta and when the steering amount T decreases from the target steering amount Ta.

Note that the ECU 10 may set the target steering amount Ta such that a value where the gain K1 is added to either the first curvature $\rho 1$ or the second curvature $\rho 2$, and a value where the gain K2 is added to a horizontal deviation $\Delta y$ are added to obtain the target steering amount Ta. The horizontal deviation $\Delta y$ represents a difference between the center of the own lane in the vehicle width direction and the current location of the own vehicle.

Figure 3:
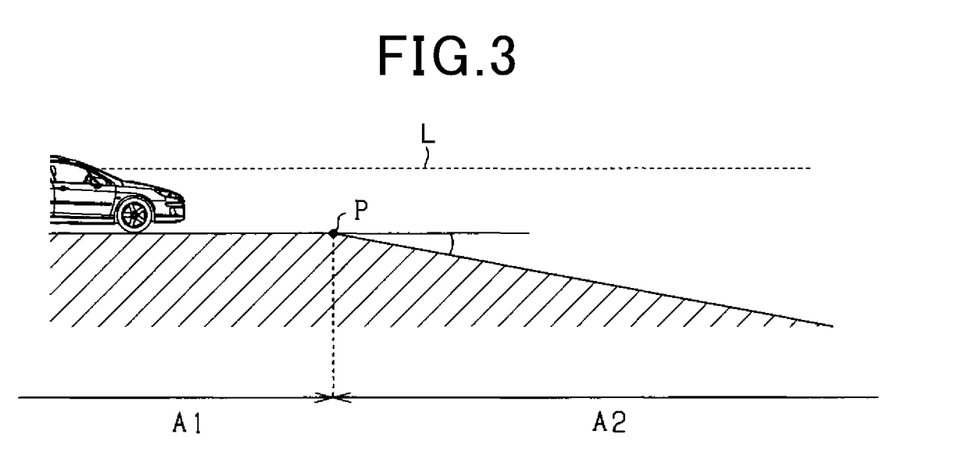
FIG. 3 is a diagram showing an own vehicle travelling on a road having a slope.

FIG. 3 is a diagram showing a state where the own vehicle travels on a road having a road slope ahead of the own vehicle, which is viewed from a horizontal direction of the own vehicle. In FIG. 3, a slope change point P is present ahead of the own vehicle and the road slope decreases from the slope change point P to a vehicle distance side A2. According to the present embodiment, a case where the road slope from the slope change point P to the vehicle distance side A2 is inclined downward with respect to the road slope from the slope change point P to a vehicle vicinity side A1, is referred to as a decrease in road slope. On the other hand, a case where the road slope from the slope change point P to the vehicle distance side A2 is inclined upward with respect to the road slope from the slope change point P to a vehicle vicinity side A1, is referred to as an increase in road slope. Note that as a case where the road slope decreases, for example, it is expected that state of the road changes from a flat road to a downhill road. As a case where the road slope increases, for example, it is expected that the state of the road changes from a flat road to an uphill road.

Figure 4A:
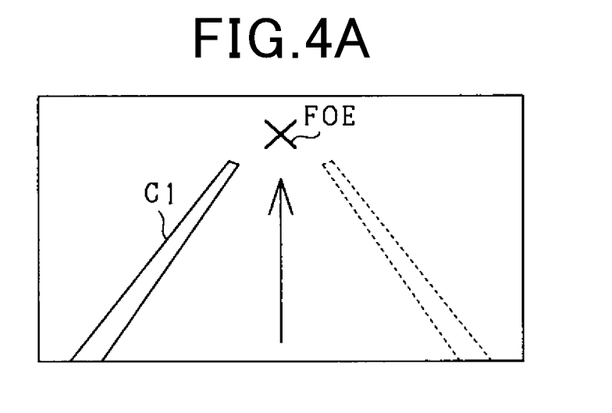
FIGS. 4A and 4B are diagrams each showing a captured image.
Figure 4B:
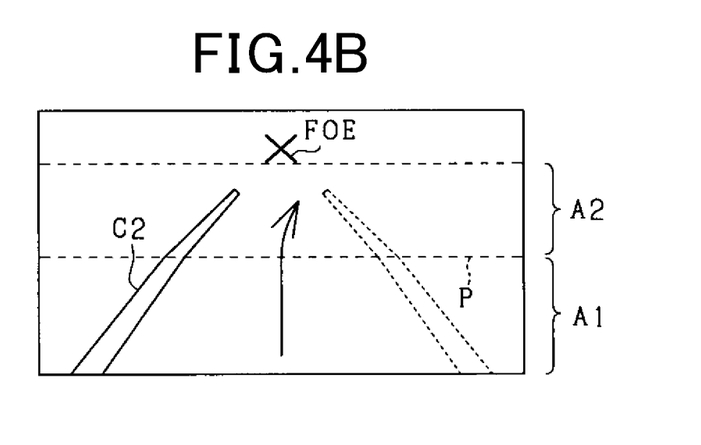

When the road slope changes on the road where the own vehicle travels, a distance between the capturing axis B and the road surface in the height direction varies around the slope change point P and may cause a distortion of the marking in the road width direction in the captured image. FIG. 4A illustrates a captured image when the own vehicle travels on a straight road having no road slope. FIG. 4B illustrates a captured image when the own vehicle travels on a straight road having a road slope shown in FIG. 3. In FIGS. 4A and 4B, a travelling route of the own vehicle set in the steering control based on the road curvature is shown with an arrow. According to the present embodiment, a presence of a change in the road slope is defined as a case where a change in the road slope is larger than or equal to a predetermined value, and an absence of a change in the road slope is defined as a case where a change in the road slope is less than the predetermined value.

When the own vehicle travels on a straight road without a change in the road slope, as shown in FIG. 4A, a left side marking C1 extends linearly towards a vanishing point FOE from a vehicle vicinity side. On the other hand, when the own vehicle travels on a straight road with a change in the road slope, as shown in FIG. 4B, the left side marking C2 extends linearly towards the vanishing point FOE in a region from the slope change point P to the vehicle vicinity side A1. Further, in the vehicle distance side A2 farther than the slope change point P, the left side marking C2 does not extend towards the vanishing point FOE, and is distorted inward with respect to the road width direction.

In the case where the ECU 10 estimates the second curvature ρ2 using single side marking in the left right markings, due to an influence by the distortion of the marking in the captured image, the second curvature ρ2 may be set to be a value smaller than the actual road curvature and an unnecessary steering amount may be applied to the own vehicle. For example, when the own vehicle travels on a straight road with a change in the road slope, since the second curvature ρ2 is estimated to be a value smaller than the actual road curvature, it is possible that the own vehicle is unable to travel along the straight road because of the steering amount being applied in either the left or right direction. According to an example of FIG. 4B, compared to a case shown in FIG. 4A, a steering amount in the right direction is applied to the own vehicle, whereby the travelling route of the own vehicle is shifted to the right direction.

In this respect, the ECU 10 restricts the steering control during a change road determination state where only single side marking in the left right markings has been detected and a change in the road slope has been detected. Specifically, the ECU 10 sets a steering change rate R when increasing the steering amount, to be a value smaller than a reference value, thereby restricting the steering control.

As a determination whether a change in the road slope is present, a known optical flow method is used for the determination according to the present embodiment. The optical flow method indicates a movement vector of a pixel that constitutes an object in the captured image.

In a flat road in which the road slope is not changed, in the captured image, a stationary object appears from the vanishing point FOE and the optical flow of the stationary object is recognized as a line segment extending in the vehicle width direction when going towards the vehicle vicinity side from the vehicle distance side.

On the other hand, when the road slope changes ahead of the own vehicle, the stationary object does not appear from the vanishing point so that the optical flow of the stationary object is not linear. For example, when the road slope decreases more in the vehicle distance side than in the slope change point, the stationary object appears from lower side of the FOE point in the captured image. Also, when the road slope increases in the vehicle distance side than in the slope change point, the stationary object appears from the upper side of the FOE point. Hence, the ECU 10 detects, in the captured image, stationary objects such as electric poles, signs, signals and street trees in accordance with a known pattern matching method using dictionary information, and calculates a change in the optical flow around the FOE point in the detected stationary object. Then, the ECU 10 determines whether a change in the road slope is present based on a change in the optical flow.

Figure 5:
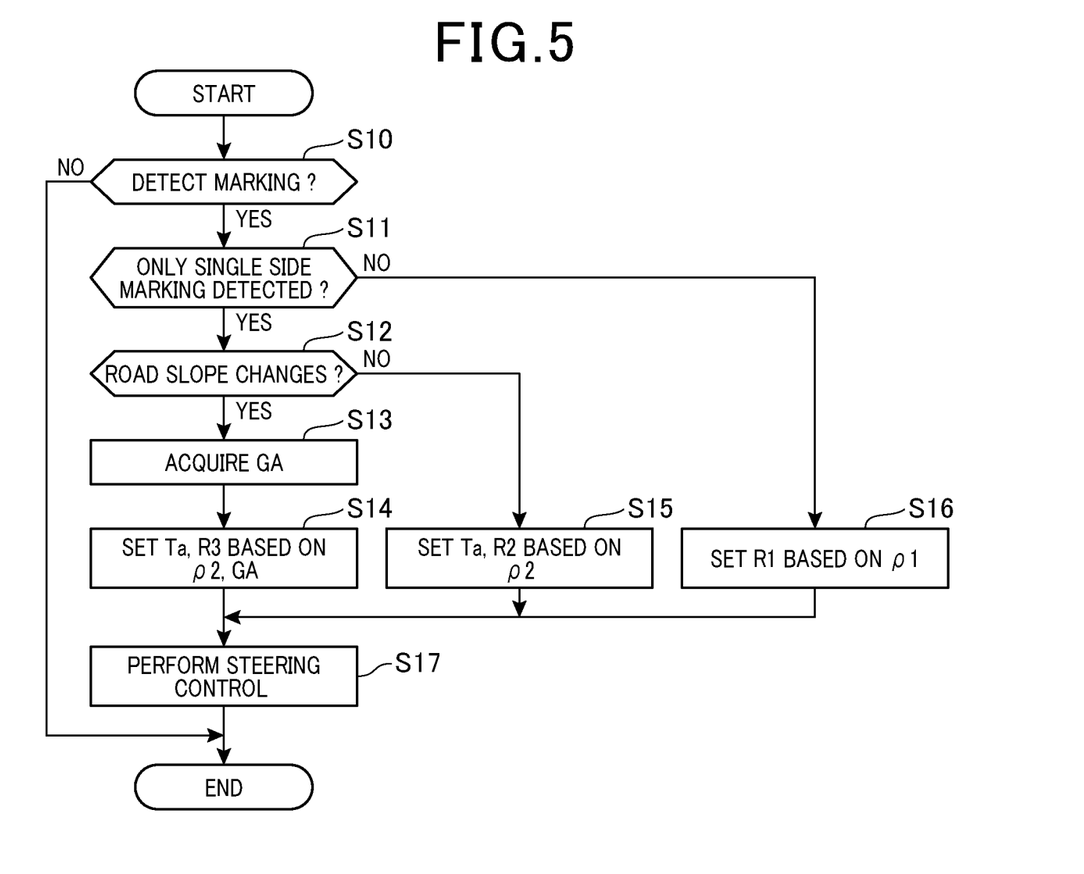
FIG. 5 is a flowchart showing a process of setting a steering amount.

Next, with reference to the flowchart shown in FIG. 5, a procedure for executing the steering control will be described. The flowchart shown in FIG. 5 is repeatedly executed by the ECU 10 at predetermined periods.

At step S11, the process determines whether only single side marking has been detected in the captured image. Step S11 corresponds to a single side determination unit.

At step S11, when the process determines that both left and right markings have been detected, processing proceeds to step S16. At step S16, the process sets the target steering amount Ta and the first steering change rate R1 based on the first curvature ρ1 which has been estimated using both left and right markings. For example, a map is stored in advance, which defines a relationship between the target steering amount Ta and the first steering change rate R1 in accordance with the first curvature ρ1. Then, the process refers to the map, thereby setting the target steering amount Ta and the first steering change rate R1 corresponding to the first curvature ρ1.

At step S11, when the process determines that only single side marking of the left and right markings has been detected, the process proceeds to step S12. At step S12, the process determines whether a change in the road slope is present ahead of the own vehicle. When the process determines that there is no change in the road slope ahead of the own vehicle, the process proceeds to step S15. Step S12 corresponds to slope determination unit.

Figure 6:
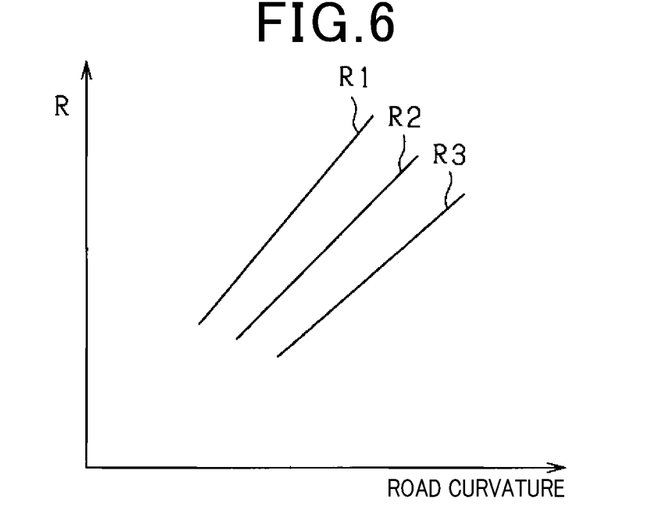
FIG. 6 is a graph showing a steering amount set by the ECU.

At step S15, the process sets the target steering amount Ta and the second steering change rate R2 based on the second curvature ρ2 which has been estimated using both left and right markings. In FIG. 6, the horizontal axis is defined as the road curvature and the vertical axis is defined as the steering change rate. According to the present embodiment, the second steering change rate R2 is set to be smaller than or equal to the first steering change rate R1. This is because the first curvature ρ1 which has been estimated using the left and right markings has higher estimation accuracy of the road curvature than the second curvature ρ2 which has been estimated using single side marking in the left and right markings.

Referring back to FIG. 5, at step S12, when the process determines that a change in the road slope is present ahead of the own vehicle, the process proceeds to step S13. As a change in the road slope becomes larger, in the captured image, distortion of the marking in the road width direction becomes larger in the vehicle distance side beyond the slope change point. Hence, at step S13, the process acquires a change amount GA of the road slope. The change amount GA of the road slope refers to a relative change amount of the road surface between the vehicle vicinity side and the vehicle distance side with respect to the slope change point. For example, at step S12, the process stores a slope change amount map which defines a correspondence between a direction of the optical flow used for determination whether a change in the road slope is present, and the change amount GA of the road slope. Then, the process may acquire, from the slope change amount map, the change amount GA corresponding to the direction of the optical flow used for the determination at step S12. Step S13 corresponds to a change amount acquiring unit.

At step S14, the process sets the target steering amount Ta and a third steering change rate R3 based on the second curvature ρ2. At this moment, the process sets the third steering change rate R3 based on the change amount GA. As shown in FIG. 6, when the road curvature (ρ2) is the same value, the third steering change rate R3 is smaller than the second steering change rate R2.

According to the present embodiment, the larger the change amount GA, the smaller the third steering change rate R3. For example, a steering amount map is stored in advance, which defines a correspondence between a combination of the second curvature ρ2 and the change amount Ga, and a combination of the target steering amount Ta and the third steering change rate R3. Then, by referring to the steering amount map, the process may set the target steering amount Ta and the third steering change rate R3. Note that the maximum value of the third steering change rate R2 which is set depending on the change amount GA is smaller than the second steering change rate R2.

At step S17, the process performs a steering control based on the target steering amount Ta and steering change rates R1 to R2 which have been set in any of steps S14 to S16. At this moment, when the steering control is performed based on the third steering change rate R3 which has been set at step S14, the steering change rate is restricted compared to a case where the steering control is performed based on the first steering change rate R1 which has been set at step S16.

Steps S14 to S17 corresponds to a control unit. When the process at step S17 ends, the process temporarily terminates the process shown in FIG. 5.

According to the above-described embodiment, the following effects and advantages are obtained.

The ECU 10 restricts the steering control performed based on the second curvature ρ2 during a change road determination state where only single side marking has been detected using the captured image and a change in the road slope has been detected. Hence, even when the road shape is estimated based on the single side marking, the own vehicle can be prevented from being applied with an unnecessary steering amount due to the influence of a distortion in the marking caused by a change in the road slope.

As a change in the road slope becomes larger, in the captured image, distortion of the marking in the road width direction becomes larger in the vehicle distance side beyond the slope change point. In this regard, the ECU 10 acquires a change amount GA of the road slope of the own vehicle when determining a change in road slope. Then, based on the change amount GA, the ECU 10 variably sets restriction of the steering control. In this case, depending on an amount of distortion of the marking, the ECU 10 is able to change the restriction applied to the steering control so that unnecessary restriction can be prevented from being applied to the steering control.

When comparing a case where the second curvature ρ2 is estimated from single side marking of the left and right markings and a case where the first curvature ρ1 is estimated from both of the left and right markings, since the former case has lower estimation accuracy of the road curvature than that of the latter case, the steering control may preferably be restricted for the former case. However, even in the case where only single side marking is detected but a change in the road slope is not detected, distortion of the marking in the road width direction in the captured image becomes small compared to a case where a change in the road slope is detected. In this respect, the ECU 10 strengthens the restriction of the steering control in the change road determination state, compared to restriction of the steering control in the flat road determination state. In other words, the ECU 10 weakens the restriction of the steering control in the flat road determination state, compared to restriction of the steering control in the change road determination state. In this case, when estimating the road shape using single side marking, the restriction of the steering control can be prevented from being unnecessarily strengthened.

Second Embodiment

According to the second embodiment, configuration differing from the first embodiment will be mainly described. Note that portions applied with the same reference numbers represent the same portion and repetitive description will be avoided.

In the second embodiment, as a change in the road slope, a case where the road slope increases and a case where the road slope decreases are distinguished, and the steering change rate when the road slope decreases is lowered compared to a case where the steering change rate when the road slope decreases. An example of decreasing road slope is that the state of the road changes from a float road to a down slope road.

Figure 7A:
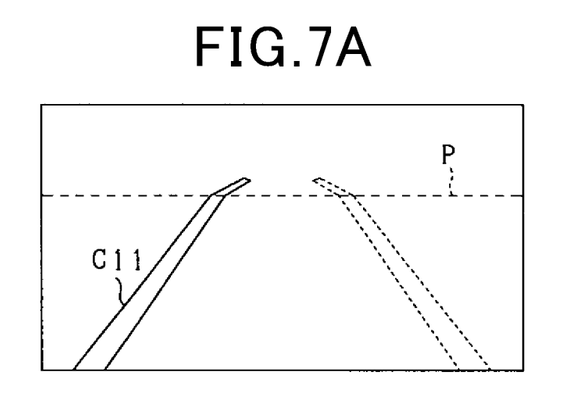
FIGS. 7A and 7B are diagrams showing a difference between captured images when the road slope is changed to increase and decrease.
Figure 7B:
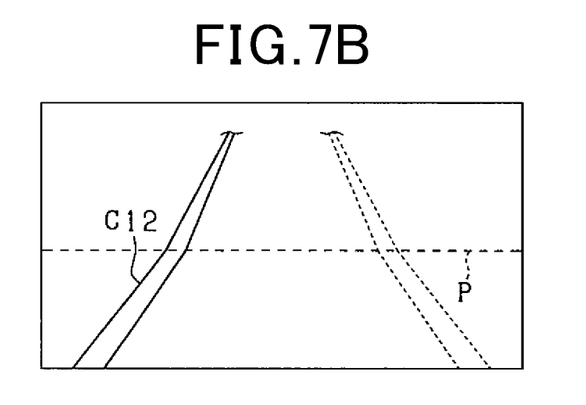

FIG. 7A shows a captured image when the road slope ahead of the own vehicle decreases on a straight road, and FIG. 7B shows, on the same straight road, a captured image when the road slope ahead of the vehicle increases.

In the case where the steering control is performed by LKA control or the like, a steering amount is controlled to have the own vehicle travel parallel to the marking. As shown in FIG. 7A, when the road slope decreases, in the captured image, the single side marking C11 is possibly distorted and deformed inward in the distance side farther than the slope change point P and may be disappeared. On the other hand, as shown in FIG. 7B, when the road slope decreases, in the captured image, the single side marking C12 is distorted and deformed outward in the distance side farther than the slope change point P, but is still present. Hence, for example, when comparing a case where the road slope decreases and a case where the road slope increases, in the former case, the marking used for estimation of the road curvature becomes excessively small so that estimation accuracy is lowered. As a result, the steering control may be influenced by this lower estimation accuracy of the road curvature.

In this respect, according to the present embodiment, when determining that the road slope decreases, the ECU 10 strengthens the restriction of the steering control, compared to a case where the road slope increases.

Figure 8:
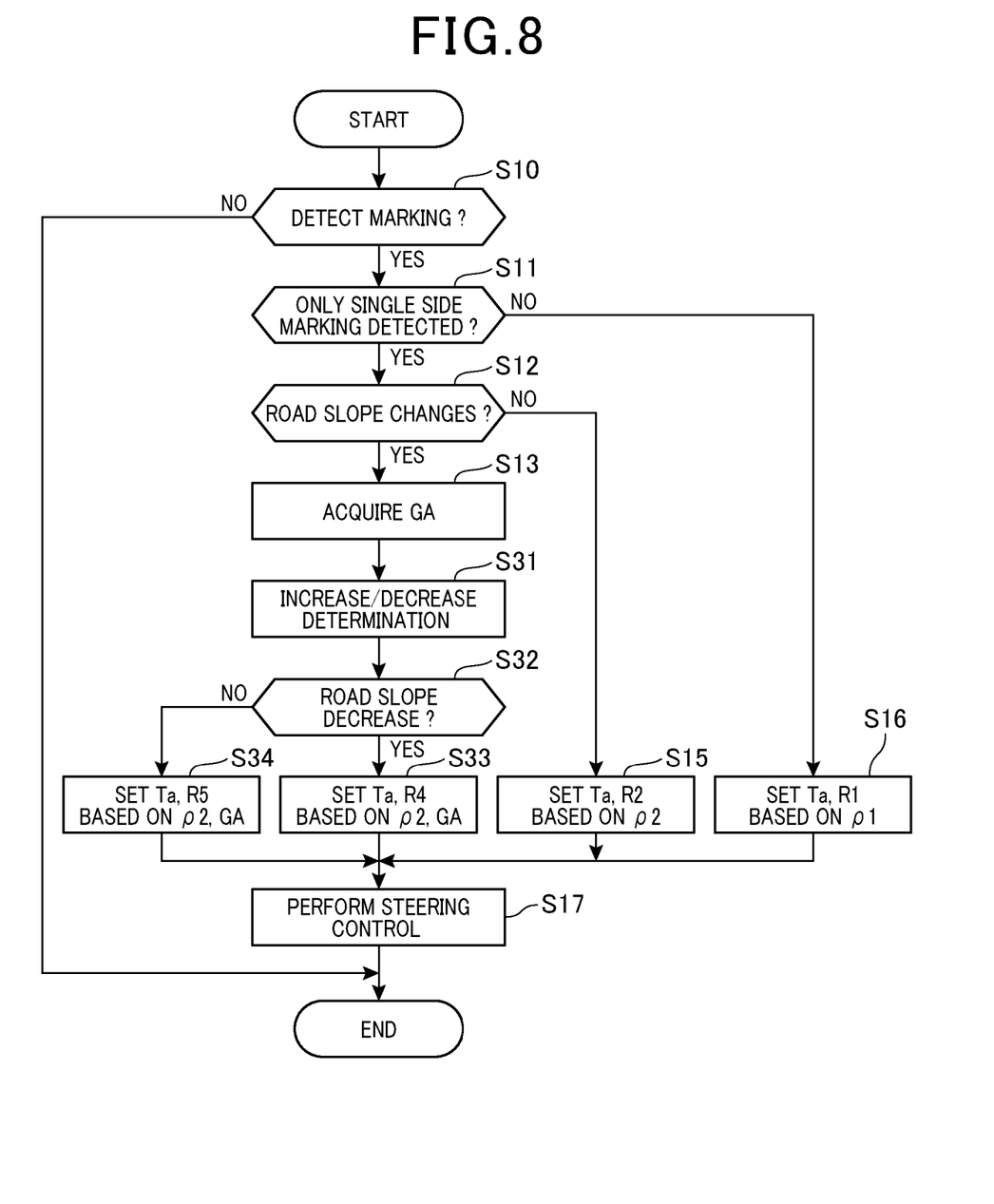
FIG. 8 is a flowchart showing a process of setting a steering amount according to a second embodiment.

With respect to FIG. 8, a process for setting the target steering amount Ta and the steering change rate R according to the second embodiment will be described. The flowchart shown in FIG. 8 is repeatedly executed by the ECU 10 at predetermined periods.

At step S12, when the process determines that a change in the road is present, the process proceeds to step S13 and acquires a change amount GA of the road slope.

At step S31, the process performs an increase/decrease determination of the road slope. The increase/decrease determination of the road slope may be performed using the optical flow used for determining a change in the road slope. In this case, when the optical flow is formed such that a stationary object appears from the upper side of the vanishing point FOE in the captured image, the process is able to determine that the road slope increases ahead of the own vehicle. On the other hand, when the optical flow is formed such that the stationary object appears from the lower side of the vanishing point FOE, the process is able to determine that the road slope decreases ahead of the own vehicle. Step S31 corresponds to increase/decrease determination unit.

At step S32, when the increase/decrease determination determines that the road slope decreases, the process proceeds to step S33 and sets the target steering amount Ta and the steering change rate R4 based on the second curvature ρ2. On the other hand, when the increase/decrease determination determines that the road slope increases, the process proceeds to step S34 and acquires the target steering amount Ta and the steering change rate R5 based on the second curvature ρ2. The steering change rate R4 is set to be smaller than the steering change rate R5 when the road curvature (ρ2) and the change amount GA are the same as those of the steering change rate R5 since the steering change rate R4 is set when determined that the road slope decreases. Note that the steering change rate R4 and the steering change rate R5 are changed depending on respective change amounts GA.

When processes of the steps S33 and S34 are ended, the process temporarily terminates the process shown in FIG. 8

According to the second embodiment described above, the ECU 10 determines whether the road slope increases or decreases, when determining that the road slope changes. Then, when determined that the road slope decreases, restriction applied to the steering control is strengthened more than a case where the road slope is determined as increase. In this case, the steering control can be restricted to be a safer side with respect to a change direction of the road slope which deteriorates the estimation accuracy of the road curvature.

Third Embodiment

Figure 9:
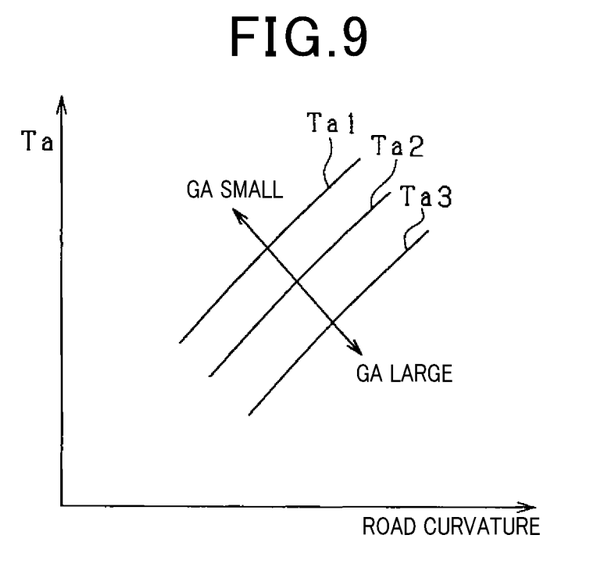
FIG. 9 is a graph showing a steering amount set by the ECU according to a third embodiment.

According to the third embodiment, when determining that a change in the road slope is present, instead of using the steering change rate R, the target steering amount Ta may be restricted. FIG. 9 is a diagram showing a steering amount set by the ECU 10 according to the third embodiment.

In this case, at step S14, the process sets the target steering amount Ta2 depending on the second curvature ρ2 and the change amount GA of the road slope. Specifically, at step S14, the target steering amount Ta2 is set such that the larger the change amount GA of the road slope, the smaller the value of the target steering amount Ta2 in the same road curvature. The upper limit value of the target steering amount Ta2 may be defined as a value lower than or equal to the target steering amount Ta1 which is set at step S15 depending on the second curvature ρ2.

According to the present embodiment described above, similar effects and advantages can be obtained.

First Modification of Third Embodiment

In the case where it is determined that a change in the road slope is present, the ECU 10 may change the limit value of the steering angle as restriction of the steering control. In this case, the process may set, at steps S14 and S15, the limit value of the steering angle together with the target steering amount Ta and the steering change rate R. Also, the limit value of the steering angle to be set at step S14 is set such that the larger the change amount GA of the road slope, the smaller the upper limit of the steering angle.

Second Modification of Third Embodiment

The ECU 10 may change each of the target steering amount Ta, the steering change rate R and the limit value of the steering angle so as to restrict the steering control. For example, the ECU 10 may set, when determining that the road slope changes, the target steering amount Ta, the steering change rate R and the steering angle such that the restriction applied to the steering control is strengthened more than the case where a change in the road slope is not present.

Other Embodiments

Instead of changing the third steering change rate R2 or the target steering amount Ta depending on the change amount GA of the road slope, the change amount may be a fixed value. In this case, when the process determines that the road slope is present at step S12 in FIG. 5, the process proceeds to step S14 and sets the third steering change rate R3.

When the ECU 10 estimates the second curvature ρ2 using only single side marking, and determines that no slope change is present, the ECU 10 may set the second steering change rate R2 to be a value the same as the first steering change rate R1

The ECU 10 may optionally not perform the steering control when the change amount GA of the road slope acquired at step S13 is larger than a predetermined controllable threshold which defines a controllable steering control.

The ECU 10 may perform, instead of LKA (lane keeping assist) control, a lane departure avoidance control that notifies the driver with an alert when the own vehicle departs from the marking. Also in this case, the ECU 10 may apply restriction to the steering control when only single side marking has been detected and determines that a change in the road slope is present.

In the case where the steering control system 100 is provided with a navigation apparatus which stores map information, the ECU 100 may use the absolute coordinate on the road and a slope angle of each section of the road which constitute the map information to determine a change in the road slope. In this case, at step S12, the map information may be utilized to detect a region on the road where the slope angle changes, thereby determining whether a change in the road slope is present.

When the steering control system 100 includes a navigation apparatus, the apparatus may acquire the change amount GA of the road slope at step S12 and perform an increase/decrease determination of the road slope at step S32 using the map information.

What is claimed is:
1. A vehicle control apparatus comprising:
a marking detection unit that detects, using a processor, a marking defining an own lane based on an image ahead of an own vehicle captured by an imaging device;
a curvature estimation unit that estimates, using the processor, a curvature of the own lane ahead of the own vehicle based on the marking detected by the marking detection unit;
a control unit that performs, using the processor, steering control of the own vehicle based on the estimated curvature of the own lane estimated by the curvature estimation unit;
a single side determination unit that determines, using the processor, whether the detected marking detected by the marking detection unit is only a marking on a single side of the own vehicle, among both left side and right side markings, such that it is determined whether the detected marking is a single side marking; and
a slope determination unit that determines, using the processor, whether a change in a road slope of the road is present ahead of the own vehicle,
wherein
the control unit is configured to apply restriction to the steering control according to a change road determination state where only the single side marking is detected and a change in the road slope is detected.
2. The vehicle control apparatus according to claim 1, wherein:
the apparatus includes a change amount acquiring unit that acquires, using the processor, an amount of change of the road slope when the slope determination unit determines that the road slope changes; and the control unit is configured to set a degree of the restriction applied to the steering control in the change road determination state based on the amount of change in the road slope acquired by the change amount acquiring unit.

3. The vehicle control apparatus according to claim 1, wherein:

the apparatus includes an increase/decrease determination unit that determines, using the processor, whether the road slope increases or decreases when the slope determination unit detects a change in the road slope; and when it is determined that the road slope decreases, the control unit is configured to apply more restriction to the steering control than in a case when it is determined that the road slope increases by the increase/decrease determination unit.

4. The vehicle control apparatus according to claim 1, wherein the control unit is further configured to:

apply restriction to the steering control during a flat road determination state where only the single side marking has been detected and a change in the road slope has not been detected, and apply less restriction to the steering control in the flat road determination state as compared to the restriction of the steering control in the change road determination state.

5. The vehicle control apparatus according to claim 1, wherein the control unit is further configured to restrict at least any one of: a steering change rate, a target steering amount, and an upper limit value of a steering angle for the own vehicle, thereby applying restriction to the steering control.

* * * * *